United States Patent [19]
Terada et al.

[11] Patent Number: 6,156,379
[45] Date of Patent: Dec. 5, 2000

[54] METALLIC COATING COMPOSITION AND METHOD FOR FORMING A MULTILAYER COATING

[75] Inventors: Sadao Terada, Neyagawa; Hiroyuki Nakasuji, Hirakata, both of Japan

[73] Assignee: Nippon Paint Co., Ltd., Osaka, Japan

[21] Appl. No.: 09/100,016

[22] Filed: Jun. 19, 1998

[30] Foreign Application Priority Data

Jun. 20, 1997 [JP] Japan ..................................... 9-163891

[51] Int. Cl.⁷ ............................... C09D 5/10; B05D 5/00
[52] U.S. Cl. .......................... 427/214; 523/200; 427/404; 427/409; 106/403; 106/404; 524/441
[58] Field of Search ..................................... 427/274, 404, 427/409; 106/403, 404; 523/200; 524/441

[56] References Cited

U.S. PATENT DOCUMENTS

| | | |
|---|---|---|
| 2,636,257 | 4/1953 | Ford . |
| 2,843,503 | 7/1958 | Salo et al. . |
| 2,941,894 | 6/1960 | McAdow . |
| 4,116,710 | 9/1978 | Heikel ...................................... 106/290 |
| 4,226,901 | 10/1980 | Sugiura et al. . |
| 4,265,936 | 5/1981 | Prohaska, Jr. . |
| 5,147,453 | 9/1992 | Panush et al. . |

FOREIGN PATENT DOCUMENTS

| | | |
|---|---|---|
| 2-8268 | 11/1990 | Japan . |
| 545962 | 1/1942 | United Kingdom . |

OTHER PUBLICATIONS

Japanese Patent Laying–Open No. 06–219097 (1994) and English Abstract thereof (Aug. 9, 1994).
Patent Abstracts of Japan Pub. No. 02008268 A (English abstract of above mentioned Japanese patent.

*Primary Examiner*—Andrew E. C. Merriam
*Attorney, Agent, or Firm*—Townsend & Banta

[57] ABSTRACT

A metallic coating composition is disclosed which contains bright pigments in the form of metal flakes produced by finely dividing a vapor-deposited metal layer. The metallic coating composition may be applied over a base coating layer. A clear topcoating layer may further be applied over the metallic coating layer.

8 Claims, 1 Drawing Sheet

METALLIC COATING COMPOSITION AND METHOD FOR FORMING A MULTILAYER COATING

BACKGROUND OF THE INVENTION

1. Field of the Invention

The present invention relates to a metallic coating composition capable of providing a metallic coating which provides a metal-surface-like luster exhibiting some specular reflection as exhibited by metal foil or metal plating surfaces, and also to a method of forming a multilayer coating utilizing the metallic coating.

2. Description of Related Art

Known metallic coatings contain metal flakes, such as aluminum flakes, and are typically applied to automobile bodies. Such metallic coatings for typical application to automobile bodies provide a unique designing, e.g., sparkling effect.

There are known electrical appliance and automobile parts which provide a metal-surface-like luster such as provided by a metal surface, which is different in nature from the sparkling luster provided by the aforementioned metallic coatings. Such parts with the metal-surface-like luster generally have a surface covered with a metal foil such as an aluminum foil. Alternatively, a thin film of metal is deposited on the surface by means of plating or vapor deposition.

However, in the technique of covering a substrate surface with the metal foil, a problem arises when the substrate has a complicated configuration having irregular surfaces. In such a case, localized wrinkling occurs in the foil to result in uneven coverage of the surface with the foil. Where the plating technique is utilized, the substrate is limited to electrically conductive materials. Otherwise, a conductive layer must be provided on the substrate surface. Also, the requirement of dipping the whole substrate in a plating bath complicates a manufacturing process and constrains plant design. When utilizing the vapor deposition technique, the substrate must be placed in a vacuumed or pressure-reduced container, making difficult to apply the technique to large-sized substrates. The requirement of pressure reduction also imposes a practical limitation on a manufacturing process. The practice of the aforementioned conventional techniques, which involve either adhesion of a metal foil or deposition of a metallic thin film by means of plating or vapor deposition, produces metallic coats which sometimes provide excessively intense gross, i.e., specular gloss. In such an instance, a special processing, such as surface roughening, is further required to reduce the gloss.

SUMMARY OF THE INVENTION

It is an object of the present invention to provide a metallic coating composition capable of producing a metallic coating which provides an appropriate metal-surface-like luster, as well as a method of forming a multilayer coating utilizing the metallic coating composition.

The metallic coating composition of the present invention is characterized as containing bright pigments in the form of metal flakes produced by finely dividing a vapor-deposited metal layer.

The bright pigment for use in the present invention is not particularly limited, so long as it is in the form of a metal flake produced by finely dividing a vapor-deposited metal layer. Such bright pigments are obtainable generally by vapor depositing a metal layer on a base film, separating the metal layer from the base film, and finely dividing the vapor-deposited metal layer into metal flakes. The thickness of the vapor-deposited metal layer, i.e., the thickness of the metal flake obtained by finely dividing the film is preferably in the range of 100–1000 Å. It is also preferred that the finely divided metal flake has a particle diameter ranging from about 5 $\mu$m to about 100 $\mu$m.

The material types of the vapor-deposited metal layer are not particularly limited, and include aluminum, gold, silver, copper, brass, titanium, chromium, nickel, nickel chrome, and stainless steel, for example.

Since the bright pigment for use in the present invention is in the form of the metal flake produced by finely dividing the vapor-deposited metal layer, its thickness is very small. Accordingly, the hereinafter-described planar orientation of the bright pigments results in formation of a flat-surfaced metallic coating layer which provides for the metal-surface-like luster. On the other hand, metal flakes, such as aluminum flakes, employed for formulation of conventional metallic coating compositions are generally produced by pulverizing metallic particles or foils as by a ball mill. Such metal flakes are relatively thick and have irregular surfaces. Accordingly, the planar orientation of these metal flakes fails to produce a flat surface, i.e., fails to provide for the metal-surface-like luster which is attainable by the present invention.

The bright pigment for use in the present invention can be manufactured by using the techniques such as disclosed in Japanese Patent Laid-open No. 02-8268 and International Publication No. WO 93/23481. For example, a plastic film, such as an OPP (oriented polypropylene), CPP (crystalline polypropylene) or PET (polyethylene terephthalate) film, is employed as a base film to which a release coating is applied. A metal layer is deposited on the release coating. After deposition of the metal layer, a top coating may be applied to an outside surface of the metal layer to prevent oxidation thereof. Examples of applicable release and top coatings include resins, such as acrylic resin, vinyl resin, nitrocellulose, cellulosic resin, polyamide resin, polyester resin, EVA resin, chlorinated PP resin, chlorinated EVA resin, and petroleum resin.

The vapor-deposited metal layer is separated from the base film for subsequent comminution into metal flakes. The residual release and/or top coatings that may remain on the metal flake dissolve in a solvent generally used in metallic coating compositions.

The metallic coating composition of the present invention can be formulated by mixing the bright pigments obtainable by the method as stated above, a solvent, and an additives) when needed. For the metallic coating produced from the composition of the present invention, the pigment weight concentration (PWC) of the bright pigment in the coating composition is preferably controlled at as high a level as possible. It is preferably at least 15%, more preferably at least 50%, and still more preferably at least 70%. In the most preferred embodiment of the present invention, the metallic coating composition consists essentially of the bright pigments and the solvent. By "the metallic coating composition consists essentially of the bright pigments and the solvent", it is meant that the metallic coating composition either contains no ingredient other than the bright pigments and the solvent, or contains a small amount of resin or additive in addition to the bright pigments and the solvent, i.e., exhibits the PWC of at least 95%. The increased level of PWC for the metallic coating is effective to promote the planar orientation of the bright pigments in the resulting metallic coating, which serves to reduce sparkling effect of the bright pigments, leading to an increased tendency of imparting more appropriate metal-surface-like luster to the resulting metallic coating.

The type of the solvent for inclusion in the metallic coating composition of the present invention can be suitably chosen depending upon the types of the release and top coatings employed for manufacturing the bright pigments, and the type of an undercoating over which the metallic coating is applied. Examples of suitable solvents include toluene, xylene, n-hexane, cyclohexane, methyl acetate, ethyl acetate, isopropyl acetate, n-propyl acetate, n-butyl acetate, isobutyl acetate, methanol, ethanol, n-propyl alcohol, isopropyl alcohol, n-butyl alcohol, isobutyl alcohol, sec-butyl alcohol, acetone, methylethyl ketone, methyl isobutyl ketone, propylene glycol monomethyl ether, propylene glycol monomethyl ether acetate, propylene glycol monoethyl ether, propylene glycol monoethyl ether acetate, ethylene glycol monomethyl ether, ethylene glycol monomethyl ether acetate, ethylene glycol monoethyl ether, ethylene glycol monoethyl ether acetate, and hydrocarbon solvents such as SOLVESSO 100 and SOLVESSO 150 (named in trade and manufactured by Esso Corporation; aromatic hydrocarbon solvents). Where the bright pigments are obtained in the form of a metal paste which is commercially available, the coating composition may include a solvent contained in the metal paste.

Although preferred that the metallic coating composition of the present invention contains a least amount of ingredients other than the bright pigments and solvent, as stated earlier, a binder resin or additive may be added when necessary. The binder resin may be chosen from those generally used as film-forming resins, illustrative of which are acrylic resins, vinyl chloride-acetate copolymer, polyamide resins, urethane resins and polyester resins. Illustrative additives include waxes such as polyethylene wax and polypropylene wax, plasticizers and dispersants.

Although the amount of metallic coating composition to be applied is not particularly limited, it may preferably controlled such that the bright pigments amount to 0.1–10 g/m².

The bright pigment content of the metallic coating composition is not particularly specified, but is preferably in the range of 0.1–30 weight %, more preferably in the range of 0.2–20 weight %. The excessively increased bright pigment content leads to a reduced degree of atomization of the coating composition when applied, which results in formation of the metallic coating with a poorer appearance. On the other hand, the excessively reduced bright pigment content results in formation of the metallic coating with a poorer metal-surface-like luster design.

The method of the present invention for forming a multilayer coating is characterized by formation of at least one coating layer thereof from the above-specified metallic coating composition of the present invention.

In the present method for forming a multilayer coating, a base coating layer is applied, prior to formation of a metallic coating layer. The base coating layer may be formed from a clear or color coat. In order for the multilayer coating to provide a better metal-surface-like luster, the clear coat may preferably be selected. In case of the color coat, the preferred color may be white or gray, particularly when the metallic coating layer provides an aluminum-like luster. The base coating layer also may be formed from a solvent type or powder coating.

In the preferred embodiments which practice the present method for forming a multilayer coating, subsequent to application of the base coating layer, the applied base coating layer is cured to such a degree that the bright pigments contained in the subsequently applied metallic coating composition can orient along an outer surface of the base coating layer. The metallic coating is then applied onto the cured base coating layer. Curing the base coating layer to a certain degree in this fashion, prior to application of the metallic coating layer thereover, prevents the bright pigments contained in the subsequently applied metallic coating composition from sinking into the base coating layer, and accordingly allows those bright pigments to orient along the outer surface of the cured base coating layer, so that the better metal-surface-like luster can be provided. For the base coating layer, the degree of cure may be suitably chosen depending upon the types of the base coating layer, bright pigment and solvent contained in the metallic coating composition.

In the present method for forming a multilayer coating, preferably subsequent to formation of the metallic coating layer, a clear topcoating layer is applied thereover. As stated earlier, the amount of binder resin in the metallic coating composition is preferably reduced to a minimal. However, where the binder resin is either removed or used in an excessively small amount, there is an increased possibility that the bright pigments come away from a surface of the metallic coating. Such a possibility can be reduced by the provision of the clear topcoating layer on the metallic coating layer. A generally known clear coat can be employed as constituting the clear topcoating layer. A translucent coat, what is called a colored clear coat, can also be employed. The clear topcoating layer may be formed from a solvent type or powder coating. The solvent type coating may be prepared from a one package coating, or a two package coating such as two package type urethane resin coating.

A preferred embodiment of the multilayer coating in accordance with the present invention can be formed by sequentially applying a base coating layer, a metallic coating and a clear topcoating layer. That is, interposed between the base coating and clear topcoating layers is the metallic coating layer which characteristically contains bright pigments in the form of metal flakes produced by finely dividing a vapor-deposited metal layer. The bright pigments in the metallic coating layer assume a substantially planar orientation so that the multilayer coating provides the metal-surface-like luster. Although either of clear and color coats can be employed as the base coating layer, preferred is the clear coat.

FIG. 1 is a cross-sectional view illustrating one preferred embodiment of the multilayer coating in accordance with the present invention. A metallic coating layer 2 is interposed between a base coating layer 1 and a clear topcoating layer 3. In this particular embodiment, the base coating layer 1 is formed from a clear coat.

As illustrated in FIG. 1, the metallic coating layer 2 is much smaller in thickness than the base coating layer 1 and the clear topcoating layer 3, and orients planarly between the base coating layer 1 and the clear topcoating layer 3. Such planar orientation of bright pigments in the form of metal flakes produced by finely dividing a vapor-deposited metal layer provides an appropriate metal-surface-like luster. The thickness of the base coating layer 1 is not particularly limited. The illustrated thickness is in the range of 30–200 µm, preferably in the range of 50–150 µm. The thickness of the clear topcoating layer 3 is not particularly limited, example of which is in the range of 10–50 µm, preferably in the range of 20–40 µm. The thickness of the metallic coating layer 2 is preferably small, generally not exceeding 5 µm, preferably not exceeding 2 µm.

In the case where the multilayer coating of the present invention is applied to a metallic plate, the formation of undercoating and intercoating layers may precede the application of the multilayer coating of the present invention. For example, formation of an electrocoating on the metallic plate is followed by application of the intercoating over which the multilayer coating of the present invention is applied. The color of intercoat is not particularly specified. In a particular case where aluminum flakes are employed as constituting the bright pigments, the intercoat may preferably be colored gray to provide a better metal-surface-like luster.

The present invention involves forming a coating which can provide an article with a metal-surface-like luster which may be perceived by a viewer as soft and appropriate, rather than an intense luster as stimulated by a specular gloss. Accordingly, the present invention can provide such a soft and appropriate luster, through simple processes, to automobile parts, such as a handle and a wheel, an automobile body, electric appliances, and other articles. Also, the appropriate metal-like luster can be imparted even to articles having complicated surface profiles which are difficult to be covered by metal foils.

DESCRIPTION OF THE PREFERRED EXAMPLES

Figure 1:
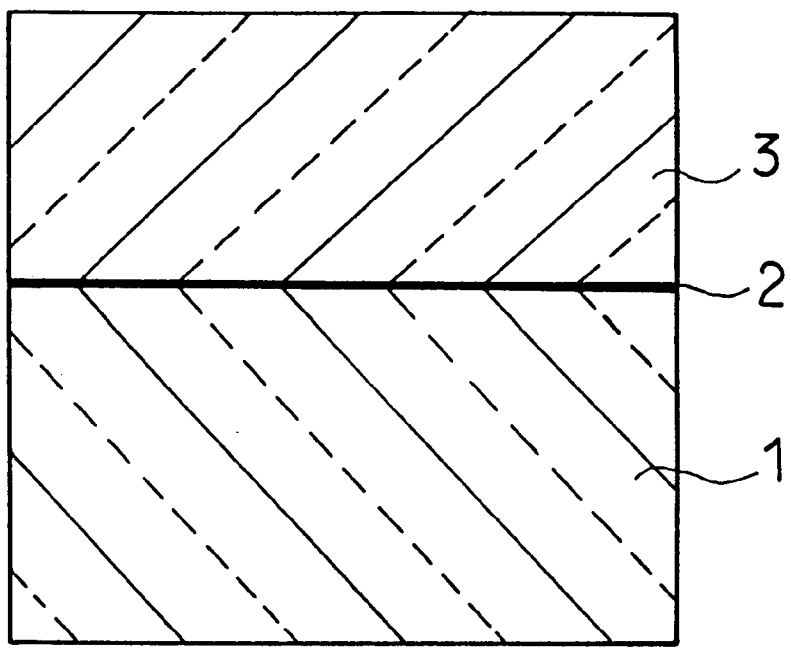
FIG. 1 is a cross-sectional view showing one embodiment of the multilayer coating in accordance with the present invention.

The present invention is now described in detail by way of specific examples. It should be understood, however, that the following examples are illustrative of the present invention and are not intended to be limiting.

PREPARATION OF ALUMINUM COATING COMPOSITIONS

An aluminum coating compositions were prepared which contained aluminum flakes produced by finely dividing a vapor-deposited aluminum layer. The following, commercially available aluminum pastes were employed as including the aluminum flakes produced by finely dividing a vapor-deposited aluminum layer.

DECOMET 1001/10 . . . named in trade and manufactured by Carl Schlenk AG, containing 10 weight % of aluminum flakes; and METALURE/L55700 . . . named in trade and manufactured by Eckart-Werke Co., Ltd., containing 10 weight % of aluminum flakes.

For comparative purposes, the following, commercially available aluminum paste was employed which contained aluminum flakes, for use in the conventional metallic coatings, produced by grinding aluminum particles or foils as by means of a ball mill.

ALPASTE . . . named in trade and manufactured by Toyo Aluminum Co., Ltd., containing 64 weight % of aluminum flakes.

The above-identified aluminum pastes were employed to prepare aluminum coating compositions which contained components in their weight proportions as indicated by parts by weight in Table 1. A thermosetting acrylic resin employed was the thermosetting acrylic resin which had a solids content of 50 weight %, a number-average molecular weight of 21,000, a hydroxyl value of 45 and an acid value of 15.

TABLE 1

| | | Preparation Exp. No. | | | | | |
|---|---|---|---|---|---|---|---|
| | | 1 | 2 | 3 | 4 | 5 | 6 |
| Type of Aluminum Paste | DECOMET 1001/10 | 5.0 | — | 20.0 | 5.0 | 5.0 | — |
| | METALURE/ L55700 | — | 5.0 | — | — | — | — |
| | ALPASTE 7160 | — | — | — | — | — | 5.0 |
| Thermosetting Acrylic Resin | | — | — | — | 4.0 | 9.0 | — |
| Xylene | | 66.5 | 66.5 | 66.5 | 66.5 | 66.5 | 66.5 |
| SOLVESSO 150 | | 19.0 | 19.0 | 19.0 | 19.0 | 19.0 | 19.0 |
| Isobutanol | | 9.5 | 9.5 | 9.5 | 9.5 | 9.5 | 9.5 |
| PWC (%) | | 100 | 100 | 100 | 20 | 10 | 100 |
| Total (Parts by Weight) | | 100.0 | 100.0 | 115.0 | 104.0 | 109.0 | 100.0 |

FORMATION OF MULTILAYER COATINGS

A cationic electrodeposition paint (POWERTOP U-50 named in trade and manufactured by Nippon Paint Co., Ltd.) was electrodeposited on a zinc phosphated, 0.8 mm thick, 10 cm×30 dull steel plate to a dry film thickness of 20 μm, which was subsequently baked at 160° C. for 30 minutes. Then, a gray intermediate coating composition (ORGA P-2 GRAY named in trade and manufactured by Nippon Paint Co., Ltd.; polyester-melamine resin paint) was spray coated over the electrodeposition paint film as obtained above to a dry film thickness of 30 μm, which was subsequently baked at 140° C. for 20 minutes to form an intermediate coat.

Next, a first layer (base coating layer), a second layer (metallic coating layer) and a third layer (clear topcoating layer), according to material combinations shown in Table 2, were sequentially formed on the intermediate coat. The first layer was electrostatically or spray applied to a dry film thickness of 100 μm. The second layer was spray applied to a dry film thickness of 1 μm. The third layer was spray applied to a dry film thickness of 30 μm. If the second layer is free of the thermosetting acrylic resin, baking may be replaced by a process of evaporating a solvent.

The following paints were employed for the first and third layers.

Paints used for forming the first layer:

Clear powder paint . . . POWDAX A50 CLEAR named in trade and manufactured by Nippon Paint Co., Ltd., acrylic epoxy resin paint;

White powder paint . . . POWDAX A50 WHITE named in trade and manufactured by Nippon Paint Co., Ltd., acrylic epoxy resin paint;

Solvent type clear paint . . . SUPERLAC M-90 CLEAR named in trade and manufactured by Nippon Paint Co., Ltd., acrylic melamine paint; and Solvent type white paint . . . SUPERLAC M-90 WHITE named in trade and manufactured by Nippon Paint Co., Ltd., acrylic melamine paint.

Paints used for forming the third layer:

O-150 clear paint . . . SUPERLAC O-150 CLEAR named in trade and manufactured by Nippon Paint Co., Ltd., acrylic melamine paint;

NAX superior clear paint . . . NAX SUPERIOR CLEAR named in trade and manufactured by Nippon Paint Co., Ltd., isocyanate cure type two package coating; and Redly clouded clear paint . . . the paint (hiding film thickness of 300 μm or greater) produced by adding 1.0 weigh % of IRGADIN RED DPP-BO (red clear pigment, manufactured by Ciba-Geigy Ltd.) to SUPERLAC O-150 CLEAR for dispersion to a size of not greater than 5 μm.

The multilayer paint films obtained in Examples 1 through 9 and Comparative Example 1 were evaluated, according to the following procedures, for appearance, metal-surface-like luster, and adhesion.

45 degrees relative to the film to remove the adhesive tape from the film. The number of the individual squares carried with the adhesive tape was counted as indicative of the degree of adhesion.

The evaluation results are given in Table 2.

TABLE 2

|  | Example No. | | | | | | | | | Comp. Exp. No. |
|---|---|---|---|---|---|---|---|---|---|---|
|  | 1 | 2 | 3 | 4 | 5 | 6 | 7 | 8 | 9 | 1 |
| 1st. Layer | Clear Powder Paint | White Powder Paint | Clear Powder Paint | Clear Powder Paint | Clear Powder Paint | Solvent Type White Paint | Solvent Type Clear Paint | — | Clear Powder Paint | Clear Powder Paint |
| Baking Condition | 130° C. 20 Min. | 130° C. 20 Min. | 130° C. 20 Min. | 130° C. 20 Min. | 130° C. 20 Min. | 140° C. 20 Min. | 140° C. 20 Min. | — | 100° C. 20 Min. | 130° C. 20 Min. |
| 2nd. Layer | Prep. Exp. 1 | Prep. Exp. 2 | Prep. Exp. 3 | Prep. Exp. 4 | Prep. Exp. 5 | Prep. Exp. 1 | Prep. Exp. 1 | Prep. Exp. 1 | Prep. Exp. 1 | Prep. Exp. 6 |
| Baking Condition | 150° C. 20 Min. | 150° C. 20 Min. | 150° C. 20 Min. | 150° C. 20 Min. | 150° C. 20 Min. | 150° C. 20 Min. | 150° C. 20 Min. | 150° C. 20 Min. | 150° C. 20 Min. | 150° C. 20 Min. |
| 3rd. Layer | O-150 Clear | O-150 Clear | Redly Clouded Clear | O-150 Clear | O-150 Clear | NAX Superior clear | O-150 Clear | O-150 Clear | O-150 Clear | O-150 Clear |
| Baking Condition | 140° C. 20 Min. | 140° C. 20 Min. | 140° C. 20 Min. | 140° C. 20 Min. | 140° C. 20 Min. | 80° C. 30 Min. | 140° C. 20 Min. | 140° C. 20 Min. | 140° C. 20 Min. | 140° C. 20 Min. |
| Appearance | 5 | 5 | 5 | 5 | 5 | 4 | 4 | 4 | 4 | 5 |
| Metal-surface-like luster | 5 | 5 | 5 | 4 | 2 | 5 | 4 | 2 | 2 | 1 |
| Adhesion | 100/100 | 100/100 | 100/100 | 100/100 | 100/100 | 100/100 | 100/100 | 100/100 | 100/100 | 0/100 |

APPEARENCE

The appearance of each multilayer paint film was visually rated based on the following standard.

5: smooth and very lustrous
4: lustrous
3: regular
2: cloudy
1: lusterless

METAL-SURFACE-LIKE LUSTER

The metal-surface-like luster of each multilayer paint film was visually rated based on the following standard.

5: excellent
4: good
3: moderate
2: cloudy
1: lusterless

ADHESION

A cutter edge of a cutter (NT cutter S-type, A-type or an equivalent thereto) was positioned at an angle of about 30 degrees relative to each multilayer film, pressed to get through a full depth of the film, and moved to form a cut line. This procedure was repeated to form a first set of eleven parallel cut lines spaced 2 mm from each other. A second set of eleven parallel cut lines, also spaced 2 mm from each other, was then formed so as to perpendicularly cross the first set of parallel cut lines, so that one hundred individual squares were defined in the film. An adhesive tape (industrial cellophane adhesive tape manufactured by Nichiban Co., Ltd.) was firmly pressed onto the film by a fingertip so as not to leave air bubbles therebetween, which insured uniform adhesion thereof. Immediately thereafter, one end of the adhesive tape was picked and pulled fast at an angle of about As can be appreciated from Table 2, the multilayer paint films of Examples 1 through 9, according to the present invention, all exhibit improved metal-surface-like luster and adhesion compared to the multilayer paint film of Comparative Example 1. The multilayer paint films of Examples of 4 and 5, respectively utilizing the coats of the binder resin-containing aluminum paints obtained in Preparation Examples 4 and 5, provide a slightly reduced degree of metal-surface-like luster compared to the multilayer paint films of the remaining Examples. This demonstrates that the metallic coating of the present invention is preferred to contain a least amount of the binder resin.

As can also be appreciated from the comparisons between Example 8 and the remaining Examples, the provision of the base coating layer contributes to the improved metal-surface-like luster. Also, the comparison between Examples 1 and 9 clearly teaches that the base coating layer subjected to increased degree of cure contributes to promotion of planar orientation of the aluminum flakes, which provides an improved metal-surface-like luster.

The present invention involves forming a coating which provides articles with the metal-surface-like luster. Accordingly, the present invention is capable of providing the metal-surface-like luster in a simpler manner compared to those conventional techniques which utilize metal foil coverage, metal plating or metal vapor deposition. In contrary to these conventional techniques which provide an excessively intense luster as stimulated by a specular gloss, the present invention is able to provide a softer and appropriate metal-surface-like luster. Therefore, the present invention is applicable to a wide range of articles, such as automobile parts, e.g., wheels and handles, automobile bodies, or household appliances.

What is claimed is:

1. A method for forming a multilayer coating including the steps of:

forming a base coating layer on an article;

forming on said base coating layer a metallic coating layer containing bright pigments in the form of metal flakes produced by finely dividing a vapor-deposited metal layer a pigment weight concentration (PWC) of the metallic coating layer being not less than 15%; and forming a clear topcoating layer on said metallic coating layer.

2. The method of claim 1, wherein after said base coating layer is applied, the base coating layer is cured to such a degree that the bright pigments contained in the subsequently applied metallic coating can orient planarly along a surface of the base coating layer.

3. The method of claim 1, wherein said base coating layer is formed from a solvent based coating or a powder coating.

4. The method of claim 1, wherein said clear topcoating layer is formed from a solvent based coating or a powder coating.

5. The method of claim 4, wherein said solvent based coating is prepared from a one package coating or a two package coating.

6. The method of claim 1, wherein said base coating layer is formed from a clear coating, while said clear topcoating layer is formed from a clear coating or a colored clear coating.

7. The method of claim 1, wherein said base coating layer is formed from a colored coating, while said clear topcoating layer is formed from a clear coating or a colored clear coating.

8. The method of claim 1, wherein the metallic coating layer does not exceed 5 $\mu$m in the thickness.

* * * * *